Figure 1:
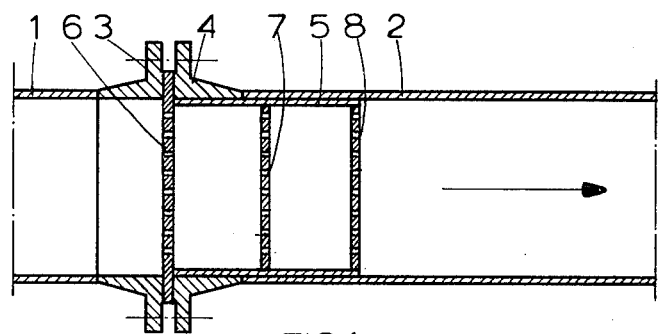

United States Patent [19]
Bellinga

[11] 4,142,413
[45] Mar. 6, 1979

[54] DEVICE FOR IMPROVING THE FLOW PROFILE IN A GAS LINE

[75] Inventor: Hendrik Bellinga, Roden, Netherlands

[73] Assignee: N.V. Nederlandse Gasunie, Groningen, Netherlands

[21] Appl. No.: 803,993

[22] Filed: Jun. 6, 1977

[30] Foreign Application Priority Data

Jun. 8, 1976 [NL] Netherlands .......................... 7606133

[51] Int. Cl.[2] ............................................. G01F 15/00
[52] U.S. Cl. ............................ 73/198; 73/272 R; 138/37
[58] Field of Search ............... 73/198, 272 R, 205 R, 73/205 L; 138/37, 39–41, 104

[56] References Cited

U.S. PATENT DOCUMENTS

| 2,600,733 | 6/1952 | Clift | 138/37 X |
| 2,929,248 | 3/1960 | Sprenkle | 73/198 |
| 3,191,630 | 6/1965 | Demyan | 138/37 X |
| 3,626,755 | 12/1971 | Rudolph | 73/205 L |
| 3,678,963 | 7/1972 | Betts et al. | 138/41 |
| 3,840,051 | 10/1974 | Akashi et al. | 138/37 X |

Primary Examiner—James J. Gill
Attorney, Agent, or Firm—Cushman, Darby & Cushman

[57] ABSTRACT

Flow straightener for improving the flow profile in a gas line ahead of a flowmeter, comprising at least three plates with regularly distributed perforations and spaced apart parallel to each other perpendicularly to the axis of the line. The perforated plates are mounted with a circumferential sealing (preferably welded) in or on a sleeve which can be inserted in the line with a sliding fit.

2 Claims, 4 Drawing Figures

DEVICE FOR IMPROVING THE FLOW PROFILE IN A GAS LINE

The invention relates to a device for improving the flow profile in a gas line ahead of a flowmeter, the said device comprising at least three plates with regularly distributed perforations, which, spaced apart parellel to each other, are disposed perpendicularly to the axis of the line.

A device of this type, usually called 'flow straightener,' is known for example from U.S. Pat. No. 2,929,248.

Flow straighteners are used in order that the straight line section to be installed in front of a flowmeter for ensuring proper operation of the meter can be shortened in those places where insufficient space is available for a long straight line section (min. length: 20 times the line diameter). If a flow straightener is installed behind a bend in the line, the length of the straight line section between the flow straightener and the flowmeter may be taken equal to approximately 5 times the line diameter. Other types of flow straighteners consist for example of a nest of pipes installed in the line, or of a number of baffles disposed parallel to the axis of the line; the type of flow straightener mentioned above in the first paragraph is simple and is used the most frequently.

In the above-mentioned type of flow straightener of the known design the perforated plates are interconnected by means of spacer bolts or by means of bars welded to the plates in the longitudinal direction of the line; usually, one of the outer plates is slightly larger than the others and is clamped between two flanges of connecting line sections. It has appeared that this known design is not sufficiently effective if it is installed behind an element that has a strong disturbing effect on the flow profile. Such a situation arises in reducer stations of a natural gas grid where the gas pressure is brought down from 40–60 bar in the main line to approximately 8 bar in the local line. The quantity of withdrawn gas is measured at a relatively short distance behind the reducing valve which disturbs the flow profile in the line very strongly. The object of the invention is so to improve the flow straightener mentioned above in the first paragraph that even a strongly disturbed flow profile will be sufficiently corrected to ensure reliability of the measurement.

The invention consequently relates to a device for improving the flow profile in a gas line ahead of a flowmeter, in which device at least three plates with regularly distributed perforations, spaced apart parallel to each other, are disposed perpendicularly to the axis of the line, and in which according to the invention the perforated plates are fitted with a circumferential sealing in or on a sleeve which can be inserted in the line with a sliding fit; the perforated plates are preferentially welded into or onto the sleeve.

It is very surprising that the relatively small improvement produces a large effect. The improvement in efficiency compared with the known flow straighteners is larger than might be expected from the elimination of the bars disposed in the direction of flow and of the clearance between the inner wall of the line and the edges of the plates.

Further, if the device according to the invention is fitted with three perforated plates, the plates may be set closer together — preferentially at a distance approximately equal to half the internal diameter of the line — than in the known device where this distance is preferentially taken equal to the line diameter, so that the flow straightener according to the invention can be given a smaller overall length than the known flow director. In the abovementioned application of the device behind a reducing valve, the overall surface area of the perforations in each separate plate should preferentially come within 15 and 25% of the free sectional area of the line, although this range is not limitative.

The invention will be elucidated with reference to the drawing, where

Figure 2:
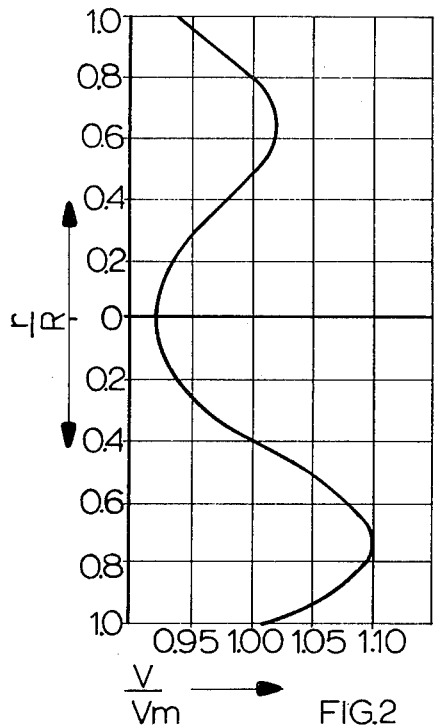
Figure 3:
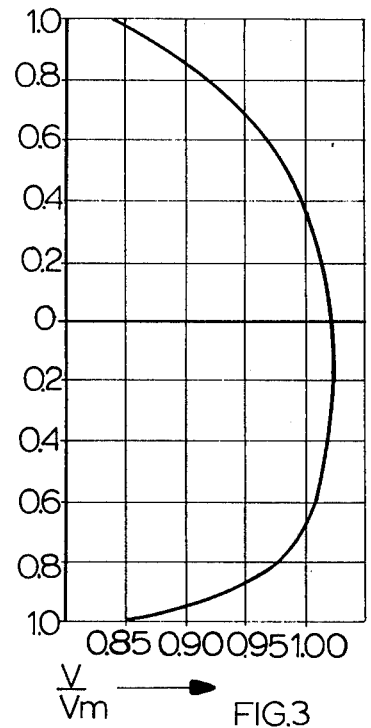

FIG. 1 shows a non-limitative example of an embodiment of a device according to the invention, FIG. 2 shows a flow profile in a gas line downstream of a known perforated plate flow straightener installed behind an element exerting a strong disturbing effect on the flow profile, FIG. 3 shows a flow profile in a gas line downstream of flow straightener according to the invention installed behind an element exerting a strong disturbing effect on the flow profile.

Figure 4:
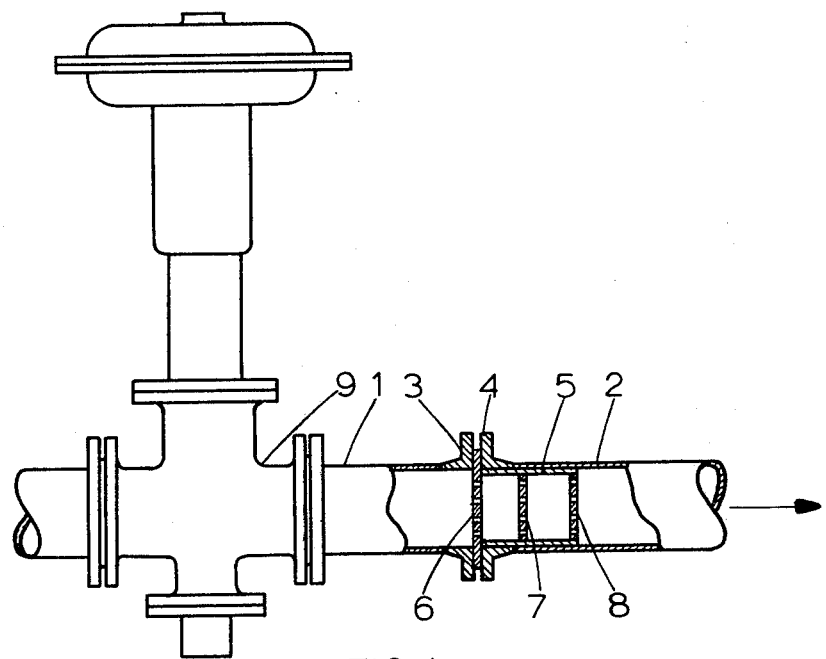

FIG. 4 shows an example of the embodiment of a device according to the invention as installed after a reducing valve.

The meaning of the reference numerals in FIG. 1 is as follows:

1 and 2 two gas line sections,
3 and 4 flanges connecting parts 1 and 2,
5 a sleeve which can be inserted in line section 2 with a sliding fit,
6 a perforated plate welded onto the end of sleeve 5; the diameter of plate 6 is so large that it can be clamped between the flanges 3 and 4 (the packing is not shown),
7 and 8 perforated plate circumferentially welded into sleeve 5.

The distances between plates 6, 7 and 8 approximately correspond to half the line diameter; the overall surface area of the perforations in each separate plate is approximately 20% of the free sectional area of the line.

The reference numerals in FIG. 4 are the same as in FIG. 1 with the addition of the reducing valve 9.

FIGS. 2 and 3 show flow profiles recorded along a diameter in a gas line at a distance of 5 times the diameter behind a flow straightener, FIG. 2 referring to a flow director of the known perforated-plate type, and FIG. 3 to a flow straightener according to the invention. In both cases a flow disturbing plate covering the entire sectional area of the line and provided with an excentrically disposed hole was placed ahead of the flow straightener. The ratio between the velocity V at a given point on a diameter and the average velocity $V_m$ is plotted on the horizontal axis, while the ratio between the distance r to the line centre and the radius R of the line is plotted on the vertical axis. As can be seen in FIG. 2, the flow profile behind the known flow straightener is still strongly disturbed, whereas the flow profile behind the flow director according to the invention (FIG. 3) substantially corresponds to that of an undisturbed flow.

I claim:

1. A device for improving the flow profile in a gas line ahead of a flow meter, the said device comprising three plates with regularly distributed perforations, said plates being spaced apart parallel to each other at a distance approximately equal to half of the internal diameter of said line and disposed perpendicular to the axis of the line, said perforated plates being mounted in said line with a circumferential sealing in or on a sleeve which can be inserted in said line with a sliding fit, with the total surface area of the perforations in each separate plate equaling 15–25% of the ree sectional area of said line.

2. A device according to claim 1 installed behind a reducing valve.

* * * * *